United States Patent [19]

Margetts

[11] 4,050,548
[45] Sept. 27, 1977

[54] AUTOMATIC ADJUSTERS FOR HYDRAULICALLY OPERATED DISC BRAKES

[75] Inventor: Hugh Grenville Margetts, Leamington Spa, England

[73] Assignee: Girling Limited, Birmingham, England

[21] Appl. No.: 712,047

[22] Filed: Aug. 6, 1976

[30] Foreign Application Priority Data

Aug. 9, 1975 United Kingdom ............... 33308/75

[51] Int. Cl.² ............................................. F16D 65/50
[52] U.S. Cl. .................................. 188/71.8; 188/196 P
[58] Field of Search ................... 188/71.8, 72.5, 196 P

[56] References Cited

FOREIGN PATENT DOCUMENTS 1,120,823  12/1961  Germany ...................... 188/196 P Primary Examiner—Duane A. Reger
Attorney, Agent, or Firm—Scrivener, Parker, Scrivener & Clarke

[57] ABSTRACT

In an hydraulically operated disc brake a stop is incorporated for determining the retracted position of the piston, the stop being movable towards the disc to compensate for wear of the friction pads and also acting as an anti knock-back device. The stop comprises a plate having an aperture through which a pin projects, the pin being fixed to the cylinder or to a second piston in the cylinder. An abutment member provides an abutment for the plate, and a first spring acts between the abutment member and the plate so as to urge the plate into a locked tilting position inclined with respect to the pin. A second spring acts on the abutment member to urge it in a direction away from the pad assembly.

16 Claims, 2 Drawing Figures

AUTOMATIC ADJUSTERS FOR HYDRAULICALLY OPERATED DISC BRAKES

This invention relates to hydraulically-operated disc brakes for vehicles of the kind in which a piston working in an hydraulic cylinder is adapted to apply a friction pad assembly to a rotatable disc, and a stop is incorporated for determining a retracted position for the piston which, in turn, defines a brake clearance between the pad assembly and the disc in the off position of the brake, the stop being movable automatically towards the disc to compensate for wear of the friction pad assembly.

When a disc of a disc brake of the kind set forth is rotating in the off position of brake, due to disc run out, for example caused by slack in the bearings of the wheel with which the disc is rotatable and irregularities in the disc itself, the disc may contact the friction pad assembly intermittently in turn to transmit a force to the piston in a direction to force or "knock-back" the piston in the cylinder by an amount greater than the brake clearance. Under such circumstances upon a subsequent brake application the volume of hydraulic fluid required to pressurise the cylinder to apply the friction pad assembly to the disc is greater than that normally required to pressurise the cylinder when only the brake clearance has to be taken up. This results in the pedal travel being excessive or unacceptably long.

In hydraulically-operated disc brakes of the kind set forth for vehicles the stop also tends to act as an anti knock-back device to prevent the piston from being knocked back in the cylinder.

In one known disc brake of the kind set forth the stop comprises a collar which is engageable frictionally with the piston. In another known disc brake the stop comprises a ring forming an abutment stop for the piston and engaging frictionally with a pin fixed with respect to the cylinder. In both these known constructions utilising friction devices a spring is incorporated to retract the piston positively in order to establish the brake clearance at the termination of a brake application.

The use of friction device also to act as an anti knock-back device imposes a limitation on the operation of the brake since the friction is operative in both directions. Thus where the friction is of sufficient magnitude to resist the effect of knock-back and the brake is to be applied, the pressure of the hydraulic fluid in the cylinder may have to be raised to overcome the friction. This may mean that the pressure has to be increased to an unacceptable value.

In another known disc brake incorporating a mechanical adjuster, a stop in the adjuster comprises a rod having a one-way locking engagement with the wall of an opening in a plate which acts on a piston through a point contact. The plate tilts under the action of springs to lock onto the rod at the termination of a brake application, thereby automatically compensating for wear of the braking surfaces. A mechanical adjuster has the disadvantage that it must be robustly constructed in order to carry the full clamp load at the brake and in fact it is not very rigid due to the point contact between the plate and the piston. Under load the point contact may deflect and allow extra actuator travel. Mechanical adjusters which are known as "load-line" adjusters are capable of supporting or providing the full clamp load even when the brake is off. They therefore present a very high resistance to knock-back and must be provided with built-in slack to counteract the effect of the spurious knock-back.

According to our invention in an hydraulically-operated disc brake of the kind set forth for vehicles the stop comprises a plate having an aperture through which projects a pin fixed to the cylinder, or to a component in the cylinder such as another piston to which said piston is relatively movable, and of a section complementary to that of the aperture, an abutment member providing an abutment for the plate, a first spring acting between the plate and the abutment member to urge the plate into a locked tilting position inclined with respect to the pin, and a second spring acting on said abutment member to urge it in a direction away from the pad assembly, an abutment on the piston limiting movement of the abutment member.

Preferably the second spring acts directly on the piston and the abutment member to urge the abutment member into engagement with a shoulder on the piston.

The second spring acts at all times to return the piston to its initial position if "knock-back" occurs while the brake is inoperative.

Since the knock-back force is taken by the second spring the only additional operating pressure necessary is that required to overcome friction in the seal of the piston and the frictional force of the engagement between the plate and the pin, which is minimal. Since the second spring acts to return the piston to a position to maintain the brake clearance substantially constant no additional fluid and no additional pedal travel is required to compensate for the effects of knock-back.

The components of the stop may be enclosed in a caged retainer, the second spring acting between one end of the retainer and the abutment member so as to urge the abutment member and the retainer into engagement with a shoulder on the piston, a clearance being provided to allow limited axial movement of the retainer with respect to the piston.

The shoulder may comprise a circlip engaged in a groove in the piston.

The inner end of the pin is preferably enclosed by a sleeve which is axially movable relative to the pin to release the plate for pad removal or service. The sleeve is of a length slightly less than the distance between the plate and the piston which remains constant whilst the plate is in the locked tilted position. The difference between length of the sleeve and the said distance is chosen so that it is preferably greater than the distance through which the piston is likely to be retracted because of knock-back. Thus there is no tendency for the plate to be released from its locked tilted position which otherwise would allow the brake clearance to increase thereby requiring additional fluid and an increased pedal travel on the next brake application.

When the brake is of the kind in which a fixed caliper straddles the peripheral edge of an axially fixed disc and friction pad assemblies are applied to opposite faces of the disc by pistons working in cylinders in opposed limbs of the caliper, the piston are all identical in construction and are as described above.

Two embodiments of our invention are illustrated in the accompanying drawings in which.

Figure 1:
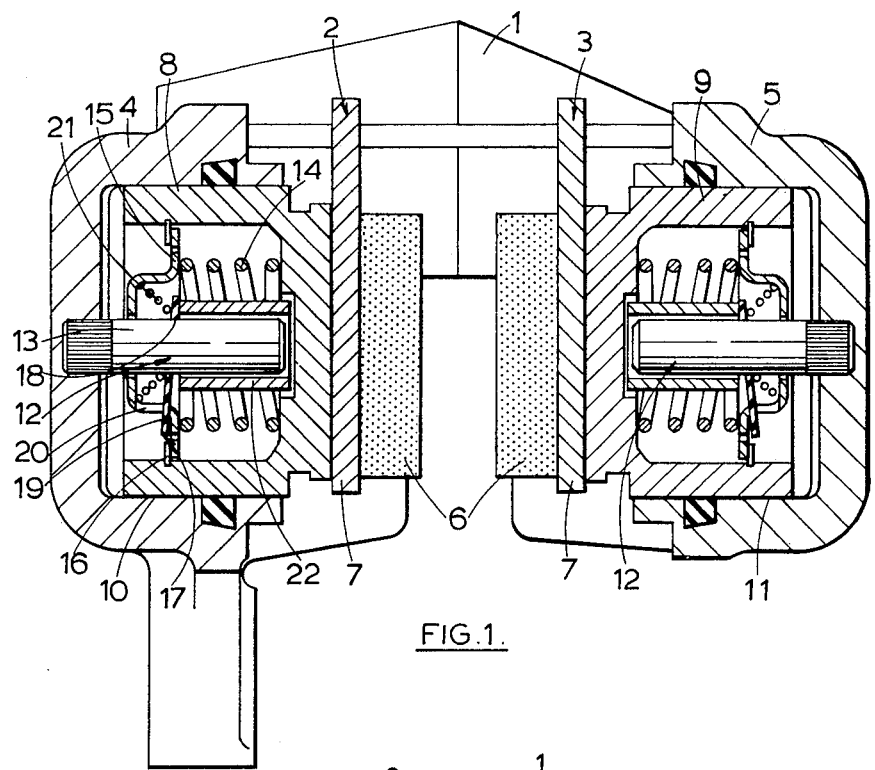
FIG. 1 is a longitudinal section through a disc brake for a vehicle.

In the disc brake illustrated in FIG. 1 of the drawings a caliper 1 of generally U outline straddling a portion of a peripheral edge of an axially fixed rotatable disc (not shown) is mounted on a fixed part adjacent to the disc. Friction pad assemblies 2,3 are located in opposite limbs 4,5 of the caliper and each assembly comprises a pad 6 of friction material for engagement with one face of the disc, and a rigid backing plate 7 carrying the friction pad 6.

Pistons 8,9 working in opposed cylinders 10,11 in the limbs act to apply to friction pads 6 to the disc when the cylinders are pressurised with hydraulic fluid.

Each piston 8,9 is of hollow cup-shaped outline and incorporates adjuster stop means 12 for determining the retracted position of the piston and for compensating for knock-back. Since both adjuster stop means are identical only that incorporated in the piston 8 will be described.

As illustrated the limb 4 is provided with a circular pin 13 which is fast in the end wall of the cylinder 10 and extends towards the closed inner end of the piston 8. A compression spring 14 acts between the said closed inner end of the piston 8 and an abutment member 15 of top-hat outline through which the pin 13 extends and which is normally urged at its peripheral edge into engagement with a circlip 16 in the wall of the piston 8.

A locking plate 17 through which the pin 13 extends has a circular opening 18 of a diameter slightly greater than that of the pin 13. A lug 19 on one side of the plate 17 projects radially through an opening 20 in the skirt of the abutment member 15 and is engaged by the flange of the member 15 normally to hold the plate 17 in an inclined position frictionally locked onto the pin 13 against the loading in a light compression spring 21 acting between the abutment member 15 and the plate 17. Thus the plate acts as a one-way clutch normally to preclude movement of the abutment member 15 towards the closed end of the cylinder 10.

A sleeve 22 encircles the inner end portion of the pin 13 and is of a length less than the distance between the plate 17, when in the inclined locked position, and the closed end of the piston 8 which is recessed and which acts on the braking plate 7.

In a normal off position of brake the components are in the relative positions illustrated.

When the brake is applied by pressurising the cylinders the abutment members 15 are advanced with the pistons 8,9 permitting the plates 17 to move into positions generally normal to the pins 13 and, if the pads 6 have worn, to be moved axially with respect to the pins 13. In either case, when the brake is released and the piston 8 retracted, retraction of the abutment member 15 due to the effect of the compression spring 14 tilts the plate 17 into the inclined position in which it locks onto the pin 13, in turn normally determining the retracted position of the piston 8 by the presence of the compression spring 14.

Should the piston 8 suffer the effects of "knock-back" as defined herein, the pistons 8 can retract into the cylinder 10 with the circlip 16 moving away from the flange of the abutment member 15.

The compression spring 14 acts at all times to return the piston into its initial positon thereby ensuring that substantially no increase in hydraulic fluid or pedal travel is required during the next brake application.

Conveniently the movement of the plate 17 in tilting into locking engagement with the pin 13 at the termination of a brake application can be made to correspond to the normal brake running clearance between the pad 6 and the disc.

To release the plate 17 for removal or replacement of the pad assembly 2 by forcing the piston 8 back into the cylinder, the sleeve 22 is effective to disengage the plate 17 from the pin 13 to facilitate further movement of the piston 8 in the same direction.

Figure 2:
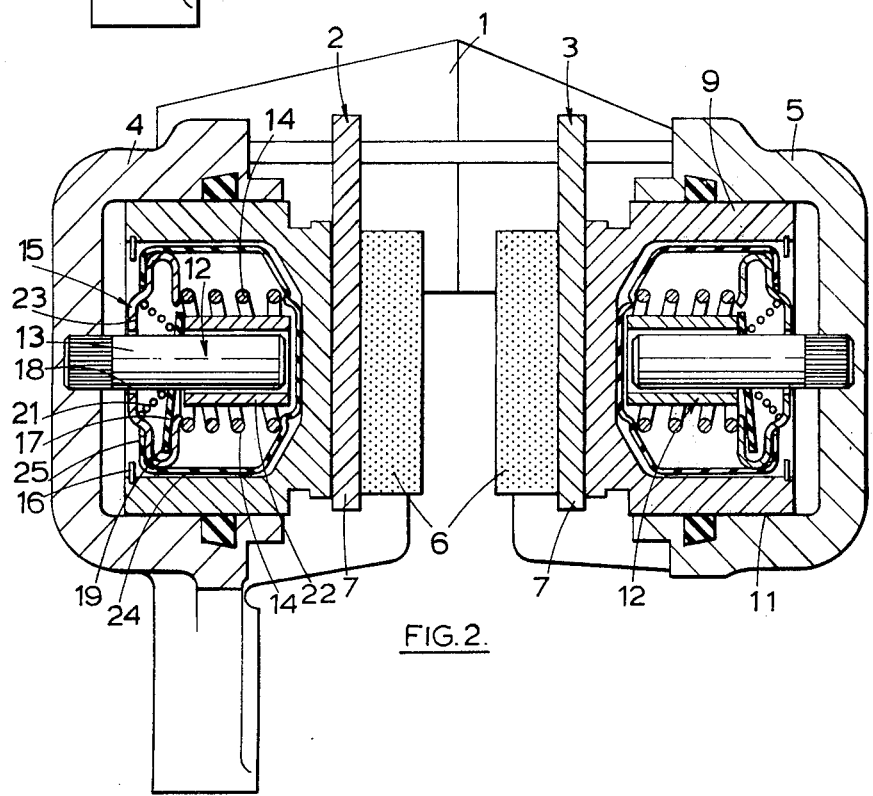
FIG. 2 is a longitudinal section similar to FIG. 1 but showing some modifications.

In the embodiment of FIG. 2 the abutment member 15 comprises a dished pressing 23 and the spring 14 abuts against a cup-shaped retainer 24 having an inturned rim 25. The components are retained with the retainer and the rim 25 engages with the pressing 23 so that the components comprise a sub-assembly for ease of assembling the brake and which has a limited axial movement with the piston 8. This limited axial movement together with the engagement of the plate with the pin 13 define the normal running brake clearance.

The construction and operation of the embodiment of FIG. 2 is otherwise the same as that of FIG. 1 and corresponding reference numerals have been applied to corresponding parts.

I claim:

1. An hydraulically-operated disc brake for a vehicle comprising a rotatable disc, friction pad assemblies for engagment with opposite sides of said disc, an hydraulic cylinder on one side of said disc, a piston working in said cylinder to apply one of said pad assemblies to said disc, stop means incorporated in said piston for determining a retracted position of said piston, said stop means comprising a plate provided with an aperture, a pin fixed to said cylinder and projecting through said aperture in said plate, said pin having a section complementary to that of said aperture, an abutment member providing a first abutment for said plate, said abutment member being slidable relative to said piston, first spring means acting on said plate so as to urge said plate towards said pad and so as to urge said plate into a locked tilting position inclined with respect to said pin, and second spring means acting on said abutment member so as to urge it in a direction away from said pad a second abutment on said piston being adapted to limit movement of said abutment member.

2. An hydraulically-operated disc brake for a vehicle comprising a rotatable disc, friction pad assemblies for engagement with opposite sides of said disc, an hydraulic cylinder on one side of said disc, a piston working in said cylinder to apply one of said pad assemblies to said disc, stop means incorporated in said piston for determining a retracted position of said piston, said stop means comprising a plate provided with an aperture, a pin fixed to said cylinder and projecting through said aperture in said plate, said pin having a section complementary to that of said aperture, an abutment member providing a first abutment of said plate, first spring means acting between said abutment member and said plate so as to urge said plate into a locked tilting position inclined with respect to said pin, and second spring means acting on said abutment member so as to urge it in a direction away from said pad, a second abutment on said piston being adapted to limit movement of said abutment member, said first abutment being radially outside said aperture and comprising means permitting contact between said plate and said abutment member only over a minor segment of the circumference of said aperture.

3. An hydraulically-operated disc brake as claimed in claim 1, wherein said second spring means acts directly between said piston and said abutment member, a shoulder on said piston limiting movement of said abutment member.

4. An hydraulically-operated disc brake as claimed in claim 1, wherein said abutment member comprises a hollow member of top hat outline having a cylindrical skirt and a radial flange, said skirt being provided with an opening, a lug on said plate extending through said opening in said skirt and engaging said flange which comprises said first abutment so as to be normally held in said locked tilting position.

5. An hydraulically-operated disc brake as claimed in claim 1, wherein a caged retainer encloses said stop means, said second spring means acting between one end of said retainer and said abutment member so as to urge said abutment member and retainer into engagement with said second abutment, means allowing limited axial movement of said retainer comprising a clearance provided between said retainer and said piston.

6. An hydraulically-operated disc brake as claimed in claim 5, wherein said abutment member comprises a dished pressing and said caged retainer comprises a cup-shaped member, an inturned rim on said cup-shaped member engaging said abutment member.

7. An hydraulically-operated disc brake as claimed in claim 3, wherein said shoulder comprises a circlip, said piston having a groove in which said circlip is engaged.

8. An hydraulically-operated disc brake as claimed in claim 1, wherein a sleeve encloses the inner end of said pin, said sleeve being axially movable relative to said pin to release said plate for pad removal or service.

9. An hydraulically-operated disc brake as claimed in claim 8, wherein said sleeve is of a length slightly less than the distance between said plate and said piston which remains constant whilst said plate is in said locked tilting position.

10. An hydraulically-operated disc brake as claimed in claim 1, wherein said piston has a blind bore at its end remote from said disc, said stop means being positioned in said bore.

11. An hydraulically-operated disc brake for a vehicle, comprising a rotatable disc, a caliper straddling a portion of the peripheral edge of said disc, friction pad for engagement with opposite faces of said disc located in assemblies in said caliper on opposite sides of said disc, hydraulic cylinders in said caliper on opposite sides of said disc, pistons working in said cylinders to apply said friction pad assemblies to said disc, stop means incorporated in each piston for determining a retracted position of said piston, each of said stop means comprising a plate provided with an aperture, a pin fixed to said cylinder and projecting through said aperture in said plate, said pin having a section complementary to that of said aperture, an abutment member providing a first abutment for said plate, said abutment member being slidable relative to said piston, first spring means acting on said plate so as to urge said plate towards said pad and so as to urge said plate into a locked tilting position inclined with respect to said pin, and second spring means acting on said abutment member so as to urge it in a direction away from said pad, a second abutment on said piston being adapted to limit movement of said abutment member.

12. An hydraulically-operated disc brake for a vehicle, comprising a rotatable disc, a caliper straddling a portion of the peripheral edge of said disc, friction pads for engagement with opposite faces of said disc located in assemblies in said caliper on opposite sides of said disc, hydraulic cylinders in said caliper on opposite sides of said disc, pistons working in said cylinders to apply said friction pad assemblies to said disc, stop means incorporated in each piston for determining a retracted position of said piston, each of said stop means comprising a plate provided with an aperture, a pin fixed to said cylinder and projecting through said aperture in said plate, said pin having a section complementary to that of said aperture, an abutment member providing a first abutment for said plate, first spring means acting between said abutment member and said plate so as to urge said plate into a locked tilting position inclined with respect to said pin, and second spring means acting on said abutment member so as to urge it in a direction away from said pad, a second abutment on said piston being adapted to limit movement of said abutment member, said first abutment being radially outside said aperture and comprising means permitting contact between said plate and said abutment member only over a minor segment of the circumference of said aperture.

13. An hydraulically-operated disc brake as claimed in claim 11, wherein said abutment member comprises a hollow member of top hat outline having a cylindrical skirt and a radial flange, said skirt being provided with an opening, a lug on said plate extending through said opening in said skirt and engaging said flange which comprises said first abutment so as to be normally held in said locked tilting position.

14. An hydraulically-operated disc brake as claimed in claim 11, wherein a caged retainer encloses said stop means said second spring means acting between one end of said retainer and said abutment member so as to urge said abutment member and retainer into engagement with said second abutment, means allowing limited axial movement of said retainer comprising a clearance provided between said retainer and said piston.

15. An hydraulically-operated disc brake as claimed in claim 11, wherein a sleeve encloses the inner end of said pin, said sleeve being axially movable relative to said pin to release said plate for pad removal or service.

16. A disc brake as claimed in claim 1, wherein said first spring acts directly between said plate and said abutment member.

* * * * *